United States Patent [19]
Park et al.

[11] Patent Number: 5,295,048
[45] Date of Patent: Mar. 15, 1994

[54] BACKLIGHT GENERATING APPARATUS OF A LIQUID CRYSTAL DISPLAY DEVICE

[75] Inventors: Jong-ho Park; Kae-seung Lee, both of Suwon, Rep. of Korea

[73] Assignee: Samsung Electron Devices Co., Ltd., Kyunggi, Rep. of Korea

[21] Appl. No.: 889,197

[22] Filed: May 28, 1992

[30] Foreign Application Priority Data

Aug. 24, 1991 [KR] Rep. of Korea ............... 91-13616

[51] Int. Cl.$^5$ .................................... G01D 11/28
[52] U.S. Cl. ................................ 362/26; 362/31; 359/49
[58] Field of Search .................... 362/26, 27, 31, 307, 362/343; 359/49, 50

[56] References Cited

U.S. PATENT DOCUMENTS 5,040,098  8/1991  Tanaka et al. ............... 362/26 X
5,146,354  9/1992  Plesinger ..................... 362/31 X

*Primary Examiner*—Stephen F. Husar
*Attorney, Agent, or Firm*—Leydig, Voit & Mayer

[57] ABSTRACT

A backlight generating apparatus of an LCD device comprising a light-passing plate which is sloped with respect to a diffusing plate by a predetermined angle. The space between the two plates is filled with a diffusing material having a larger index of refraction than that of the light-passing plate. The present invention employs a diffusing plate with a transmissivity of over 30% to increase light efficiency, improve brightness, and decrease power consumption.

13 Claims, 2 Drawing Sheets

BACKLIGHT GENERATING APPARATUS OF A LIQUID CRYSTAL DISPLAY DEVICE

BACKGROUND OF THE INVENTION

The present invention relates to a backlight generating apparatus of a liquid crystal display (LCD) device, and, more particularly to a backlight generating apparatus of an LCD device with an improved light-diffusing structure for increasing light efficiency.

Generally, an LCD device, as shown in FIG. 1, comprises polarizing filter layers 1 on both of its outer surfaces. Front and rear plates 2 and 3 form a closed space filled with liquid crystal 6 by means of sealing material 7 placed on the inside edges of the LCD device. A number of transparent electrodes 4 are disposed on the front plate 2 and the rear plate 3 in an opposing relationship. An orientation layer 5 coats the upper part of transparent electrodes 4 and the whole inner surface of the front plate 2 and the rear plate 3 which is exposed between the transparent electrodes.

The above LCD device is not a self-luminous device such as a cathode-ray tube or a vacuum fluorescent display, but a non-emissive display which performs the display by means of light from outside.

There are two kinds of LCD devices—a front reflection-type LCD which shows the predetermined pattern generated by the alignment of crystal liquid 6 using the light incident through front plate 2 and a transmission-type LCD which uses the backlight of a backlight generating apparatus incident from the rear side of the LCD to realize the display. The present invention relates to the latter, the backlight generating apparatus of a transmission-type LCD.

The conventional structure of the backlight generating apparatus of the transmission-type LCD is illustrated in FIG. 2. The illustrated backlight generating apparatus comprises a diffusing plate 11 placed facing the bottom of the rear plate 3 of an LCD device and separated from the rear plate 3 by a polarizing filter layer 1. A light-passing plate 12 is installed to the bottom of a diffusing plate 11, and a reflecting plate 13 is installed to the bottom of a light-passing plate 12 for reflecting the diffused light entering the light-passing plate 12 toward diffusing plate 11. For providing light to the light-passing plate 12, a lamp L is placed on one side of light-passing plate 12. Lamp L has a fluorescent film and reflecting film having a combined predetermined thickness, and is installed in a housing H.

In a conventional backlight generating apparatus constructed as above, the light irradiated from lamp L is irradiated onto the diffusing plate 11 via the light-passing plate 12, and then diffused by the diffusing plate 11 and directed to the rear plate of an LCD.

However, in such a conventional backlight generating apparatus, since the incident light is diffused only by diffusing plate 11, a considerable amount of the light generated from lamp L is lost. Therefore, due to the small amount of light-passing through the diffusing plate 11 onto the rear plate, a picture having sufficient brightness cannot be viewed through the LCD. This is because it is impossible to use a diffusing plate having a suitable transmissivity for diminishing the partial brightness difference of a picture. Since the transmissivity of a conventional diffusing plate is about 20-30%, a considerable amount of light is lost in the diffusing plate, thus decreasing the amount of light contributing to the display of the picture. Accordingly, heretofore, power has been applied to the lamp to compensate for the diminished brightness. However, this necessitates an undesirable increase in total power consumption.

SUMMARY OF THE INVENTION

The present invention, designed for solving the above problem, has an object to provide a backlight generating apparatus of an LCD device which decreases the power consumption of the LCD as compared with that of a conventional device.

To achieve the above object of the present invention, there is provided a backlight generating apparatus of an LCD device comprising a diffusing plate facing the bottom of the rear plate of the LCD device and a light-passing plate and a reflecting plate sequentially placed below the diffusing plate, and a lamp placed on one edge of the light-passing plate for irradiating light, wherein the surface of the light-passing plate opposing the diffusing plate is sloped with respect to the diffusing plate such that the side where the lamp is installed is close to the diffusing plate, and, as the surface of the light-passing plate gets farther away from the lamp, the surface is also farther from the diffusing plate, and, the space between the light-passing plate and the diffusing plate is filled with a diffusing material having a predetermined refractive index.

DETAILED DESCRIPTION OF THE INVENTION

Figure 1:
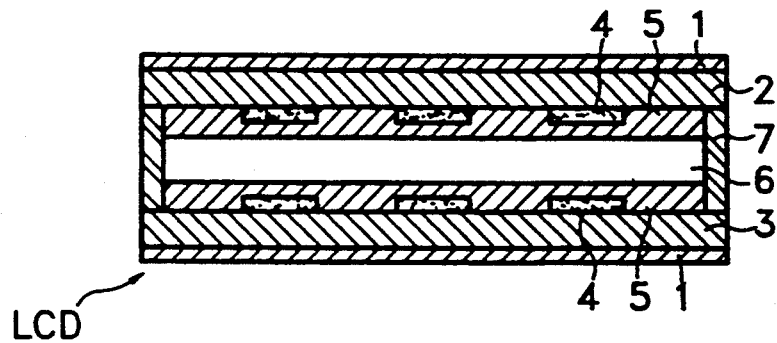
FIG. 1 is a front sectional view showing a general LCD device.
Figure 2:
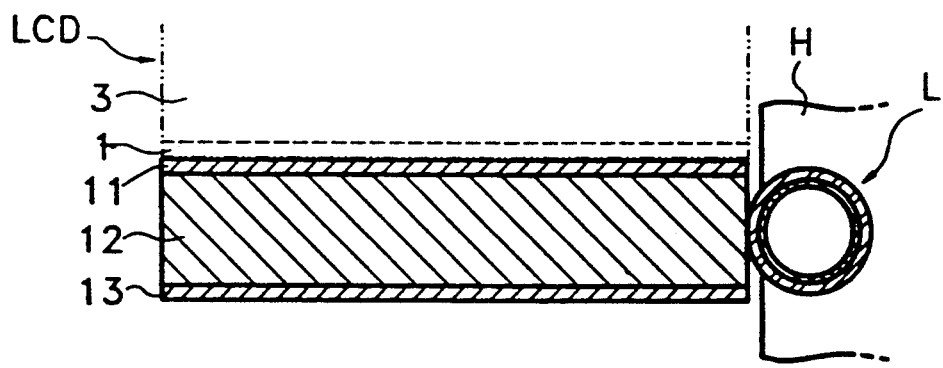
FIG. 2 is a schematic sectional view showing a backlight generating apparatus of a conventional LCD device.
Figure 3:
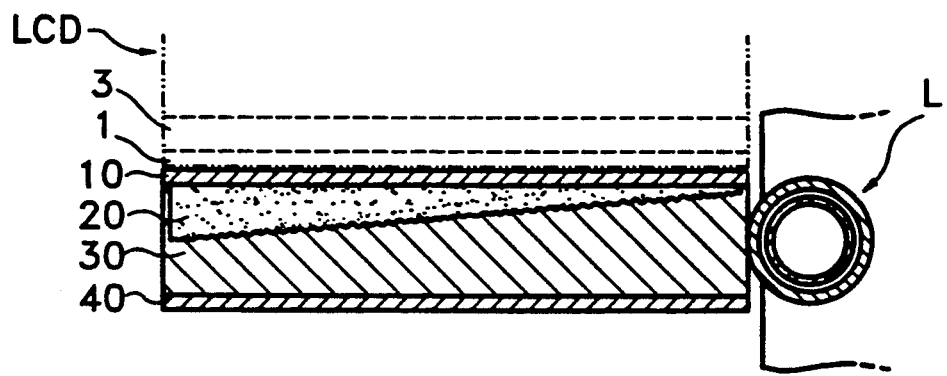
FIG. 3 is a schematic sectional view showing a backlight generating apparatus of an LCD device according to the present invention.

FIG. 3 shows the first embodiment of the backlight generating apparatus of an LCD device according to the present invention, which comprises a diffusing plate 10 facing a rear plate 3 of an LCD device and separated therefrom by a polarizing filter layer 1. A light-passing plate 30 having an upper face opposed to the diffusing plate 10 is sloped at a predetermined angle against diffusing plate 10. A lamp L is placed on the edge of the light-passing plate 30 having the larger thickness for irradiating light. Preferably, diffusing plate 10 is composed of a polycarbonate resin while light-passing plate 30 is composed of an acrylic resin. A diffusing material 20 is provided between the sloped upper face of the light-passing plate 30 and the diffusing plate 10, and a reflecting plate 40 is provided for re-reflecting light reflected from the sloped face of the light-passing plate 30 into the diffusing plate 10.

The sloped face of the light-passing plate 30 is embossed to absorb part of the light directly incident from lamp L. In keeping with the invention, as depicted in FIG. 3, the sloped face of the light-passing plate 30 approaches the surface of reflecting plate 40 as the distance from the lamp L increases. That is, the light-passing plate 30 has a positive slope with respect to the reflecting plate 40.

Figure 4:
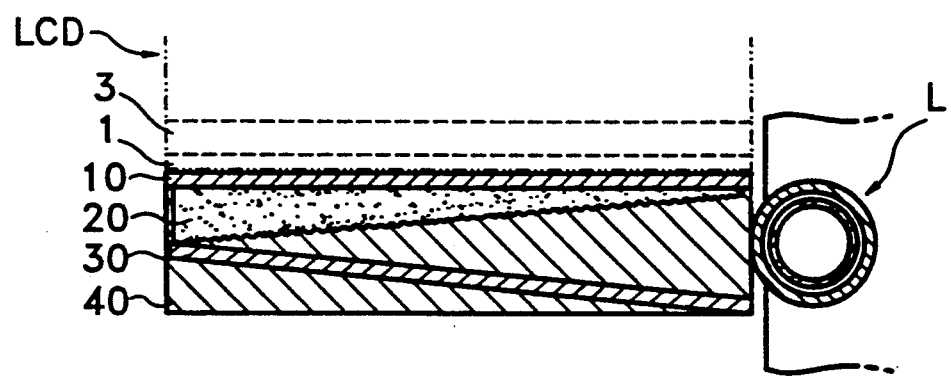
FIG. 4 is a sectional view showing another embodiment according to the present invention.

In FIG. 4 showing a second embodiment of the present invention, a reflecting plate 40 is placed so as to slope in the opposite direction of the slope of the upper face of light-passing plate 30, increasing the reflection angle of the light incident through light-passing plate 30. When employing the reflecting plate 40 in this manner, brightness is improved in comparison with the first embodiment. In the backlight generating apparatus of an LCD device having the above structure, the light incident from the lamp L is processed through the light-passing plate 30 and then irregularly reflected on the sloped face, so that part of the light is refracted to the diffusing material 20 and the other part is reflected into the reflecting plate 40 and then re-reflected up to the sloped face again to proceed into diffusing plate 10. During the light's travel into the diffusing plate 10, it is diffused in the diffusing material 20 and then directed to the diffusing plate 10 to be diffused again, thereby being irradiated to an LCD device with an even distribution.

Preferably, in each of the preceding embodiments, an index of refraction between 1.47 and 1.5. In contrast, diffusing material 20 is composed of a quartz material having an index of refraction between 1.5 and 2.4. However, any material having refractive index greater than that of the light-passing plate 30 is suitable for the diffusing material 20.

As mentioned above, in the backlight generating apparatus of an LCD device, the light is diffused twice, once by the diffusing material 20 and once by the diffusing plate 10, so that a picture having uniform brightness is achieved. Furthermore, since the first light-diffusing takes place in the diffusing material 20, it is preferable to use a diffusing plate 10 with a light-transmissivity above 30% as opposed to a conventional diffusing plate having a light transmissivity in the range of 20-30%. As a result, efficiency in the use of incident light is increased. Due to the use of a diffusing plate with a high light-transmissivity, brightness is enhanced so that under relatively low power compared with a conventional device, a picture having the desired brightness is achieved.

What is claimed is:

1. A backlight generating apparatus of an LCD device comprising:
    a diffusing plate;
    a light-passing plate and a reflecting plate sequentially stacked onto one another, said light-passing plate having a sloped surface which opposes said diffusing plate;
    diffusing material having a selected index of refraction sandwiched between said light-passing plate and said diffusing plate; and
    a lamp placed on an edge of said light-passing plate which is closest to said diffusing plate.

2. A backlight generating apparatus of an LCD device as claimed in claim 1, wherein said reflecting plate is installed so as to be sloped in the opposite direction from the sloped surface of said light-passing plate.

3. A backlight generating apparatus of an LCD device as claimed in claim 1, wherein the index of refraction of said diffusing material is larger than that of said light-passing plate.

4. A backlight generating apparatus of an LCD device as claimed in claim 2, wherein the index of refraction of said diffusing material is larger than that of said light-passing plate.

5. A backlight generating apparatus of an LCD device comprising:
    a light-passing plate having a sloped upper surface and a lower surface;
    a diffusing plate stacked on the sloped upper surface of said light-passing plate so that an aperture is created between said light-passing plate and said diffusing plate;
    a reflecting plate opposing the lower surface of said light-passing plate; and
    diffusing material disposed in the aperture between said diffusing plate and said light-passing plate having a lower surface that matches the slope of the upper surface of said light-passing plate.

6. A backlight generating apparatus of an LCD device according to claim 5, wherein said diffusing material is quartz.

7. A backlight generating apparatus of an LCD device according to claim 5, wherein said diffusing material has an index of refraction between 1.5 and 2.4.

8. A backlight generating apparatus of an LCD device according to claim 5, wherein said diffusing material has an index of refraction greater than that of said light-passing plate.

9. A backlight generating apparatus of an LCD device according to claim 5, wherein said light-passing plate has an index of refraction between 1.47 and 1.5.

10. A backlight generating apparatus of an LCD device according to claim 5, wherein said diffusing plate has a light transmissivity of over 30%.

11. A backlight generating apparatus of an LCD device according to claim 5, wherein said reflecting plate is positioned parallel to said diffusing plate.

12. A backlight generating apparatus of an LCD device according to claim 5, wherein said reflecting plate is sloped in the opposite direction from the slope of said light-passing plate.

13. A backlight generating apparatus of an LCD device comprising:
    a light-passing plate having a sloped upper surface and a lower surface;
    a diffusing plate stacked on the sloped upper surface of said light-passing plate so that an aperture is created between said light-passing plate and said diffusing plate;
    diffusing material disposed in the aperture between said diffusing plate and said light-passing plate having a lower surface that matches the slope of the upper surface of said light-passing plate;
    a lamp disposed proximate to an edge of said light-passing plate such that light generated by the lamp is processed through said light-passing plate and then irregularly reflected on the sloped face of said light-passing plate and part of the light is refracted by said diffusing material; and
    means for re-reflecting light reflected by said light-passing plate and for directing the re-reflected light to said diffusing material.

* * * * *